United States Patent
Xiang et al.

(10) Patent No.: US 10,637,084 B2
(45) Date of Patent: Apr. 28, 2020

(54) METHANOL-WATER MIXTURE REFORMING HYDROGEN PRODUCTION GENERATOR

(71) Applicant: GUANGDONG HYDROGEN ENERGY SCIENCE AND TECHNOLOGY CO., LTD, Dongguan (CN)

(72) Inventors: Hua Xiang, Dongguan (CN); Wenxia Li, Dongguan (CN); Jin Ma, Dongguan (CN); Rong Cai, Dongguan (CN); Jianlin Lei, Dongguan (CN); Weitao Yang, Dongguan (CN); Wanguang Liang, Dongguan (CN); Yongfeng Ma, Dongguan (CN)

(73) Assignee: GUANGDONG HYDROGEN ENERGY SCIENCE AND TECHNOLOGY CO., LTD., Dongguan (CN)

( * ) Notice: Subject to any disclaimer, the term of this patent is extended or adjusted under 35 U.S.C. 154(b) by 284 days.

(21) Appl. No.: 15/446,001

(22) Filed: Mar. 1, 2017

(65) Prior Publication Data
US 2017/0179513 A1    Jun. 22, 2017

Related U.S. Application Data

(63) Continuation of application No. PCT/CN2016/085782, filed on Jun. 15, 2016.

(30) Foreign Application Priority Data

Aug. 6, 2015    (CN) .......................... 2015 1 0476342

(51) Int. Cl.
*H01M 8/06*    (2016.01)
*H01M 8/04*    (2016.01)
(Continued)

(52) U.S. Cl.
CPC ........... *H01M 8/0618* (2013.01); *C01B 3/323* (2013.01); *H01M 8/04022* (2013.01);
(Continued)

(58) Field of Classification Search
None
See application file for complete search history.

(56) References Cited

U.S. PATENT DOCUMENTS 6,416,894 B1    7/2002  Aoyama
6,887,286 B1 *  5/2005  Taki ........................ B01B 1/005
                                                48/197 R
(Continued)

FOREIGN PATENT DOCUMENTS

CN    104362359 A    2/2015
CN    105070929 A    11/2015
(Continued)

*Primary Examiner* — Jonathan G Leong
*Assistant Examiner* — Julian Anthony
(74) *Attorney, Agent, or Firm* — Wayne & Ken, LLC; Tony Hom

(57) ABSTRACT

The invention discloses a methanol-water mixture reforming hydrogen production generator, including an electronic control system, a methanol-water mixture feed system, a hydrogen production system and a power generation system, where the electronic control system includes a control mainboard, a power supply device and a power output port, and the control mainboard controls operations of the methanol-water mixture feed system, the hydrogen production system and the power generation system; the power supply device includes a rechargeable battery; the methanol-water mixture feed system includes a main feed pipe, a transfer pump, a start-up feed solenoid valve, a start-up feed branch pipe, a hydrogen production feed solenoid valve and a hydrogen production feed branch pipe. All the systems coordinate with each other well, the electronic control system provides stable control, power from external power (Continued)

sources is not needed when during start-up, and the methanol-water mixture feed system has low costs and good cohesion.

9 Claims, 21 Drawing Sheets

(51) Int. Cl.
    *H01M 8/0612*     (2016.01)
    *H01M 8/04014*    (2016.01)
    *C01B 3/32*        (2006.01)

(52) U.S. Cl.
    CPC ... *H01M 8/0612* (2013.01); *C01B 2203/0233* (2013.01); *C01B 2203/0283* (2013.01); *C01B 2203/066* (2013.01); *C01B 2203/0822* (2013.01); *C01B 2203/0827* (2013.01); *C01B 2203/1223* (2013.01); *C01B 2203/1628* (2013.01)

(56) References Cited

U.S. PATENT DOCUMENTS

| | | | |
|---|---|---|---|
| 10,105,676 B2* | 10/2018 | Xiang | C01B 3/323 |
| 2002/0127447 A1* | 9/2002 | Edlund | H01M 8/04089 |
| | | | 429/423 |
| 2003/0192251 A1 | 10/2003 | Edlund et al. | |
| 2008/0171244 A1 | 7/2008 | Okuyama et al. | |

FOREIGN PATENT DOCUMENTS

| | | |
|---|---|---|
| CN | 204927424 U | 12/2015 |
| JP | H0260060 A | 2/1990 |

\* cited by examiner

METHANOL-WATER MIXTURE REFORMING HYDROGEN PRODUCTION GENERATOR

CROSS-REFERENCE TO RELATED APPLICATIONS

This application is a continuation of International Patent Application No. PCT/ICN2016/1085782 with a filing date of Jun. 15, 2016, designating the United States, now pending, and further claims priority to Chinese Patent Application No. 201510476342.5 with a filing date of Aug. 6, 2015. The content of the aforementioned application, including any intervening amendments thereto, are incorporated herein by reference.

TECHNICAL FIELD

The present invention relates to the technical field of hydrogen production and power generation devices, in particular to a methanol-water mixture reforming hydrogen production generator.

BACKGROUND OF THE PRESENT INVENTION

Hydrogen is one of the most desirable energy in the 21st century. Hydrogen produces the most energy during combustion of the same weight of coal, gasoline and hydrogen, and the product of combustion of hydrogen is water without ash and waste gas, and therefore will not pollute the environment; while the main products of combustion of coal and oil are $CO_2$ and $SO_2$, which may cause greenhouse effect and acid rain. Reserves of oil and coal are limited, but hydrogen mainly exists in water, and the only product after combustion is also water, so that hydrogen can be generated continuously and will never run out. Hydrogen is widely distributed, and water is a large "warehouse" of hydrogen and contains 11% hydrogen. Soil contains about 1.5% hydrogen; and oil, coal, natural gas, animals, plants and the like all contain hydrogen. Hydrogen mainly exists in a form of a compound of water, about 70% of the Earth's surface is covered with water, and water storage capacity is large; therefore it can be said that hydrogen is "inexhaustible" energy. If hydrogen can be produced in a suitable way, then hydrogen will also be relatively cheap energy.

At present, the methanol steam reforming technology is used to produce a gas mixture of $H_2$ and $CO_2$, then the gas mixture may be separated by a palladium membrane separator to obtain $H_2$ and $CO_2$ respectively. With reference to Chinese invention application 201310340475.0 (applicant: Shanghai Hydrogen Mobile Reformer Instrument Co., Ltd), the patent discloses a methanol-water mixture hydrogen production system in which methanol and water steam in the reforming chamber of the reformer pass through catalysts at the temperature of 350-409° C. and at the pressure condition of 1-5 MPa, and under the action of the catalysts, methanol cracking reaction and carbon monoxide shift reaction occur to generate hydrogen and carbon dioxide, and this is a gas-solid catalytic reaction system involving multiple components and multiple reactions, with reaction equations as follows: (1) $CH_3OH \rightarrow CO + 2H_2$; (2) $H_2O + CO \rightarrow CO_2 + H_2$; and (3) $CH_3OH + H_2O \rightarrow CO_2 + 3H_2$, $H_2$ and $CO_2$ generated from reactions are reformed, and then separated through the palladium membrane of a separation chamber to obtain high purity hydrogen.

With the development of technology, hydrogen is increasingly widely used in industries, such as synthetic ammonia industry and petroleum refining hydrogenating industry; in addition, hydrogen can also be used for generating electricity. With reference to Chinese invention application 201410622203.4 (applicant: Shanghai Hydrogen Mobile Reformer Instrument Co., Ltd), the invention discloses an electric generator based on methanol-water mixture hydrogen-making system and electricity generation method thereof, where the generator adopts a fuel cell as power generation equipment, the fuel cell is used for producing electric energy when electrochemical reaction occurs on hydrogen and oxygen in the air, at the anode of a fuel cell 1: $2H_2 \rightarrow 4H^+ + 4e^-$, $H_2$ is split into two protons and two electrons, the protons pass through a proton exchange membrane (PEM), and the electrons pass through an anode plate, and enter a cathode bipolar plate through an external load; and at the cathode of the fuel cell 1: $O_2 + 4e^- + 4H^+ \rightarrow 2H_2O$, the protons, the electrons and $O_2$ are recombined to form $H_2O$. The generator integrates methanol-water mixture reforming hydrogen production and the fuel cell, realizing the technical purpose of integrating hydrogen production and electricity generation. However, in the prior art, a methanol-water mixture reforming hydrogen production generator still has the following defects: coordination among systems is poor, the electronic control system has unstable control, the methanol-water mixture reforming generator needs to be connected to an external power supply during start-up, liquid feedstock is delivered to a reforming hydrogen production device and a start-up device of a hydrogen production system by mutually independent liquid feed systems, with relatively high costs, poor cohesion, and imprecise control.

SUMMARY OF PRESENT INVENTION

The technical problem solved by the present invention aims at overcoming the defects in the prior art by providing a methanol-water mixture reforming hydrogen production generator in which all systems coordinate with each other well, an electronic control system provides stable control, power from external power sources is not needed during start-up, and the methanol-water mixture feed system has low costs and good cohesion.

For solving the above technical problem, the technical solution of the present invention is as follows: a methanol-water mixture reforming hydrogen production generator includes an electronic control system, a methanol-water mixture feed system, a hydrogen production system and a power generation system, wherein the electronic control system includes a control mainboard, and a power supply device and a power output port, the control mainboard controls operations of the methanol-water mixture feed system, the hydrogen production system and the power generation system; the power supply device includes a rechargeable which supplies power to the methanol-water mixture reforming hydrogen production generator itself in the start-up process of the methanol-water mixture reforming hydrogen production generator; the power output port is used for outputting power to the outside by the power generation system;

the methanol-water mixture feed system includes a main feed pipe, a transfer pump, a start-up feed solenoid valve, a start-up feed branch pipe, a hydrogen production feed solenoid valve and a hydrogen production feed branch pipe; in the start-up process of the methanol-water mixture reforming hydrogen production generator, the start-up feed solenoid valve is opened and the hydrogen production feed solenoid valve is closed, and methanol-water mixture feedstock is fed through the main feed pipe, the transfer pump, the start-up feed solenoid valve and the start-up feed branch pipe successively and supplied to a start-up device of the hydrogen production system; in the hydrogen production process of the methanol-water mixture reforming hydrogen production generator, the hydrogen production feed solenoid valve is opened and the start-up feed solenoid valve is closed, and methanol-water mixture feedstock is fed through the main feed pipe, the transfer pump, the hydrogen production feed solenoid valve and the hydrogen production feed branch pipe successively and supplied to a reforming hydrogen production device of the hydrogen production system;

the hydrogen production system includes the reforming hydrogen production device and the start-up device, wherein the reforming hydrogen production device includes a reforming chamber, a separation chamber and a combustion chamber, the reforming chamber is used for producing a gas mixture with carbon dioxide and hydrogen as major components when reforming hydrogen production reaction occurs on methanol and water, the separation chamber is used for separating hydrogen from the gas mixture, the hydrogen may be output to the outside or supplied to a fuel cell, and the combustion chamber is used for combusting a part of the produced hydrogen in the combustion chamber to provide heat for the operation of the reforming hydrogen production device; the start-up device is used in the start-up process of the methanol-water mixture reforming hydrogen production generator, to provide heat for the start-up process of the reforming hydrogen production device through the fuel methanol-water mixture feedstock; and the power generation system includes a fuel cell, wherein the fuel cell is used for producing electric energy when electrochemical reaction is performed on hydrogen and oxygen in the air, the produced electric energy is output through the power output port, and the produced electric energy may also be used to charge the rechargeable battery.

The present invention is further illustrated as follows:

The electronic control system is further provided with a wireless signal transmitting and receiving device, wherein the wireless signal transmitting and receiving device includes a signal converter electrically connected with the control mainboard and an antenna mounted on the signal converter. The methanol-water mixture reforming hydrogen production generator further includes a mobile control device, wherein the mobile control device achieves wireless connection with the wireless signal transmitting and receiving device by way of WIFI, and the mobile control device is provided with a display module for displaying data parameters and a control module for setting working procedure of the methanol-water mixture reforming hydrogen production generator.

The power supply device further includes a first power supply module and a second power supply module, and in the process of start-up of the methanol-water mixture reforming hydrogen production generator, the rechargeable battery supplies power to the methanol-water mixture reforming hydrogen production generator itself through the first power supply module; and in the processes of hydrogen production and power generation of the methanol-water mixture reforming hydrogen production generator, the power generation system charges the rechargeable battery through the second power supply module and automatically stops the charging when the rechargeable battery is fully charged.

The methanol-water mixture reforming hydrogen production generator further includes a heat exchange system, wherein the heat exchange system includes a co-axial double-layer heat exchange pipe, a normal temperature liquid inlet, a high temperature liquid outlet, a high temperature gas inlet and a low temperature gas outlet; the inner-layer pipeline of the double-layer heat exchange pipe is a gas pipeline, and the outer-layer pipeline is a liquid pipeline; at one end of the double-layer heat exchange pipe, the gas pipeline is in communication with the high temperature gas inlet and the liquid pipeline is in communication with the high temperature liquid outlet; at the other end of the double-layer heat exchange pipe, the gas pipeline is in communication with the low temperature gas outlet, and the liquid pipeline is in communication with the normal temperature liquid inlet; in the hydrogen production process of the methanol-water mixture reforming hydrogen production generator, the methanol-water mixture feedstock in the hydrogen production feed branch pipe enters the liquid pipeline by the normal temperature liquid inlet, the hydrogen produced by the hydrogen production system enters the gas pipeline by the high temperature gas inlet, methanol-water mixture feedstock in the liquid pipeline and hydrogen in the gas pipeline exchange heat thereof, the methanol-water mixture feedstock increases in temperature and is output to the reforming hydrogen production device by the high temperature liquid outlet, and the hydrogen decreases in temperature and is output to the outside or to the fuel cell by the low temperature gas outlet.

The start-up device of the hydrogen production system includes a feed riser pipe, a flame tray, an upper cover body and an igniter, wherein the flame tray and the upper cover body are disposed on the feed riser pipe from the bottom up; the middle part of the upper cover body is provided with an aperture in communication with the feed riser pipe, the methanol-water mixture feedstock may flow from the feed riser pipe up to the aperture and be exuded from the aperture and spread around along the upper side surface of the upper cover body until flowing into the flame tray; and an ignition position of the igniter corresponds to the upper side of the upper cover body. Furthermore, a lower cover body is further provided between the flame tray and the upper cover body, wherein the lower cover body is mounted on the feed riser pipe, and may prevent the methanol-water mixture feedstock in the flame tray from sputtering outwardly. A plurality of vent holes are disposed on the periphery of the flame tray, so that external air enters through the vent holes into the flame tray and the combustion chamber in the reforming hydrogen production device, preferably, the vent holes of the flame tray are spiral vent hole grooves.

The methanol-water mixture reforming hydrogen production generator further includes a gas control system, wherein the gas control system is disposed on a transfer pipeline used for transferring the hydrogen to the fuel cell; the gas control system includes a safety gas control pipe, a safety solenoid valve and a safety air pressure sensor, wherein the safety solenoid valve and the safety air pressure sensor are mounted on the safety gas control pipe; the safety gas control pipe has a gas release hole matched with the safety solenoid valve, and in a process that hydrogen passes through the safety gas control pipe, if the safety air pressure sensor senses that a hydrogen pressure is higher than an alert pressure, the safety solenoid valve is controlled to open the gas release hole, to discharge hydrogen to the outside; and the safety solenoid valve may be powered by the rechargeable battery.

The present invention has the beneficial effects that the methanol-water mixture reforming hydrogen production generator includes the electronic control system, the methanol-water mixture feed system, the hydrogen production system and the power generation system, all the systems coordinate well, hydrogen may be produced independently and then output to the outside, hydrogen production may also be combined with power generation, the electronic control system includes the control mainboard, the power supply device and the power output port, the control mainboard controls operations of the methanol-water mixture feed system, the hydrogen production system and the power generation system, the electronic control system provides stable control, in the start-up process of the methanol-water mixture reforming hydrogen production generator, power from external power sources is not needed, and the methanol-water mixture reforming hydrogen production generator itself may be powered by the rechargeable battery, after the operation of the fuel cell is finished, the rechargeable battery can be charged in turn; the methanol-water mixture feed system is used to comprehensively control liquid feed of the reforming hydrogen production device and the start-up device, with relatively low costs and good cohesion.

DETAILED DESCRIPTION OF PREFERRED EMBODIMENTS

The structure principle and working principle of the present invention are described below in further detail with reference to the drawings.

Figure 6:
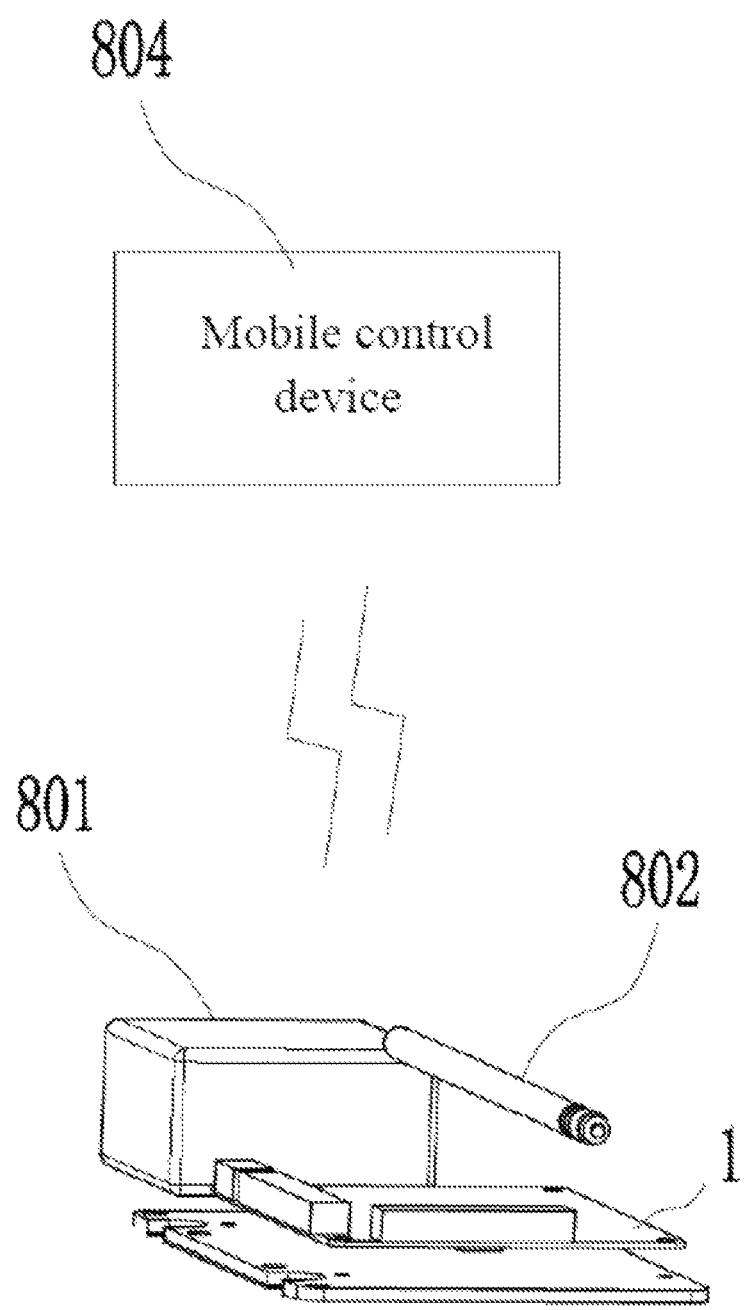
FIG. 6 is a schematic view of wireless connection between a wireless signal transmitting and receiving device and a mobile control device.

As shown in FIGS. 1-5, the present invention provides a methanol-water mixture reforming hydrogen production generator, including an electronic control system, a methanol-water mixture feed system, a hydrogen production system and a power generation system. The electronic control system, with reference to FIGS. 6-8, includes a control mainboard 1, a power supply device 2 and a power output port 3, and the control mainboard controls operations of the methanol-water mixture feed system, the hydrogen production system and the power generation system; the power supply device 2 includes a rechargeable battery 201, and in the start-up process of the methanol-water mixture reforming hydrogen production generator, the rechargeable battery 201 supplies power to the methanol-water mixture reforming hydrogen production generator itself when a start-up button 11 is pressed, specifically, the rechargeable battery 201 mainly supplies power to the control mainboard 1, a transfer pump 402, a start-up feed solenoid valve 403, a hydrogen production feed solenoid valve 405 and a start-up device 6: after the methanol-water mixture reforming hydrogen production generator is started, the rechargeable battery 201 stops supplying power to the methanol-water mixture reforming hydrogen production generator itself, except a safety solenoid valve 102; the power output port 3 is used for outputting power to the outside by the power generation system; the power output port 3 includes a current sensor 301, a DC contactor 302 and an aeronautical connector 303. The current sensor 301 is electrically connected with the control mainboard 1, the aeronautical connector 303 outputs 48V DC to the outside, and based on a desired voltage need, may also output DC with other specific values.

Figure 9:
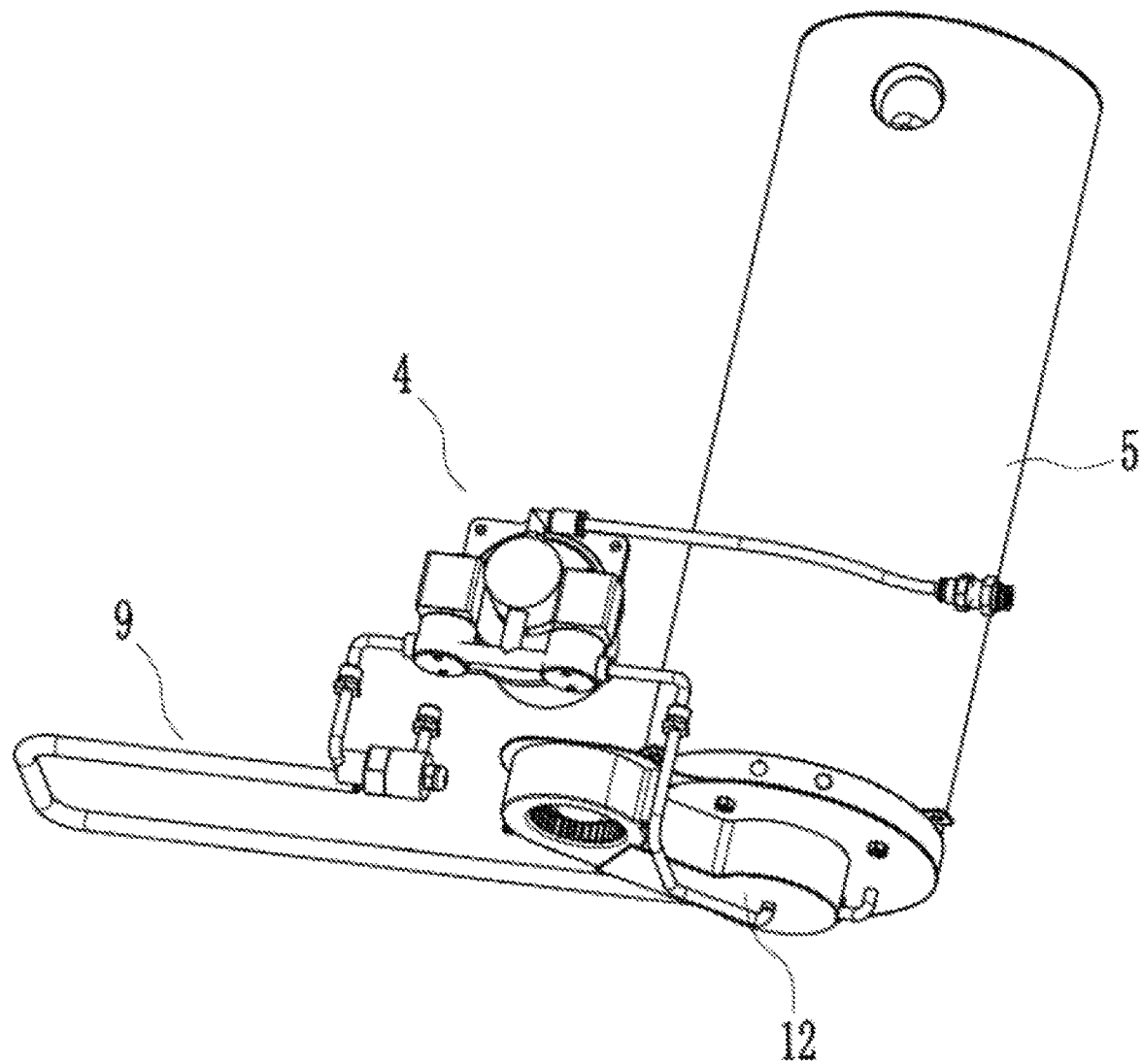
FIG. 9 is a schematic view of a stereostructure of a hydrogen production system, a methanol-water mixture feed system and a heat exchange system.
Figure 10:
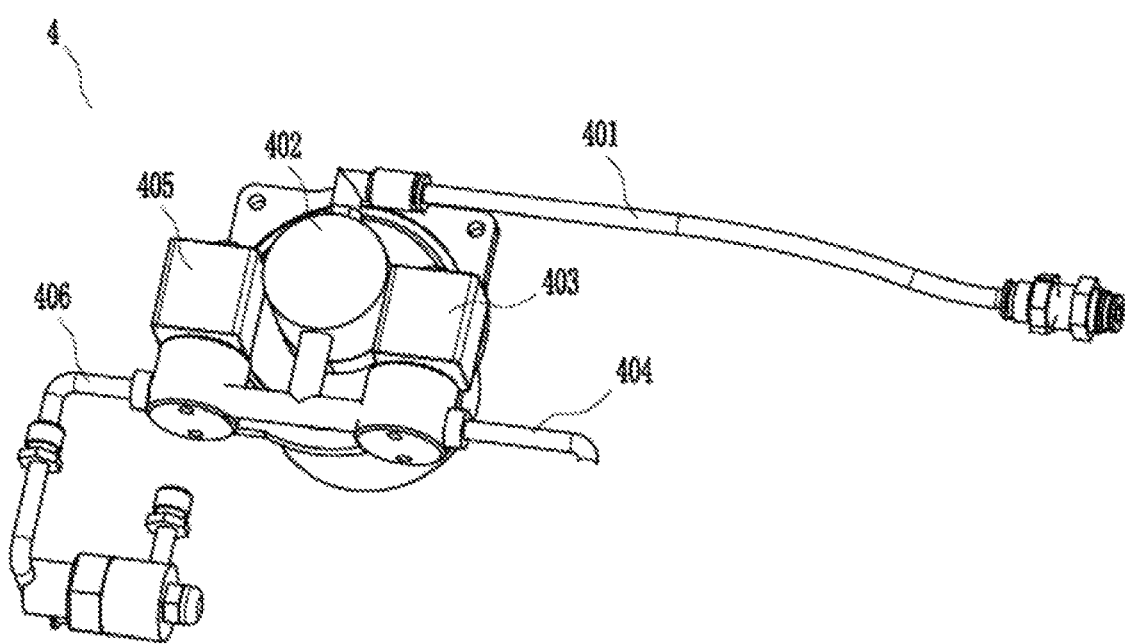
FIG. 10 is a schematic view of a stereostructure of a ethanol-water mixture feed system.
Figure 11:
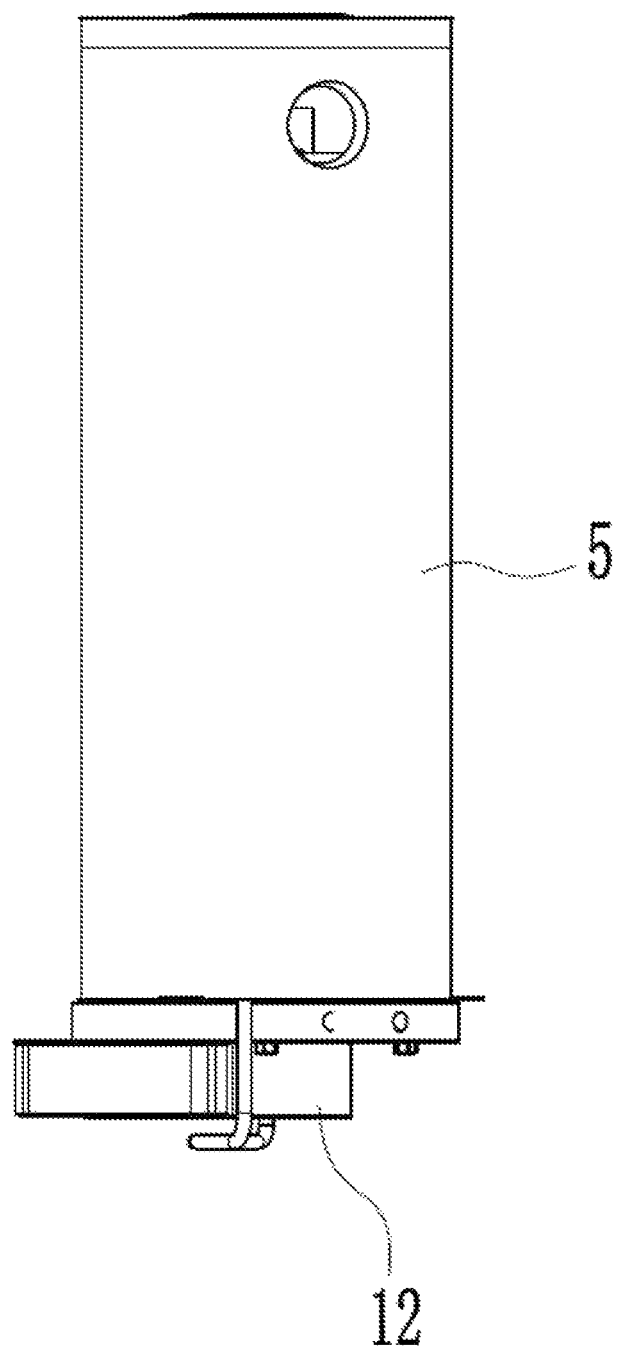
FIG. 11 is a front view of a hydrogen production system.
Figure 12:
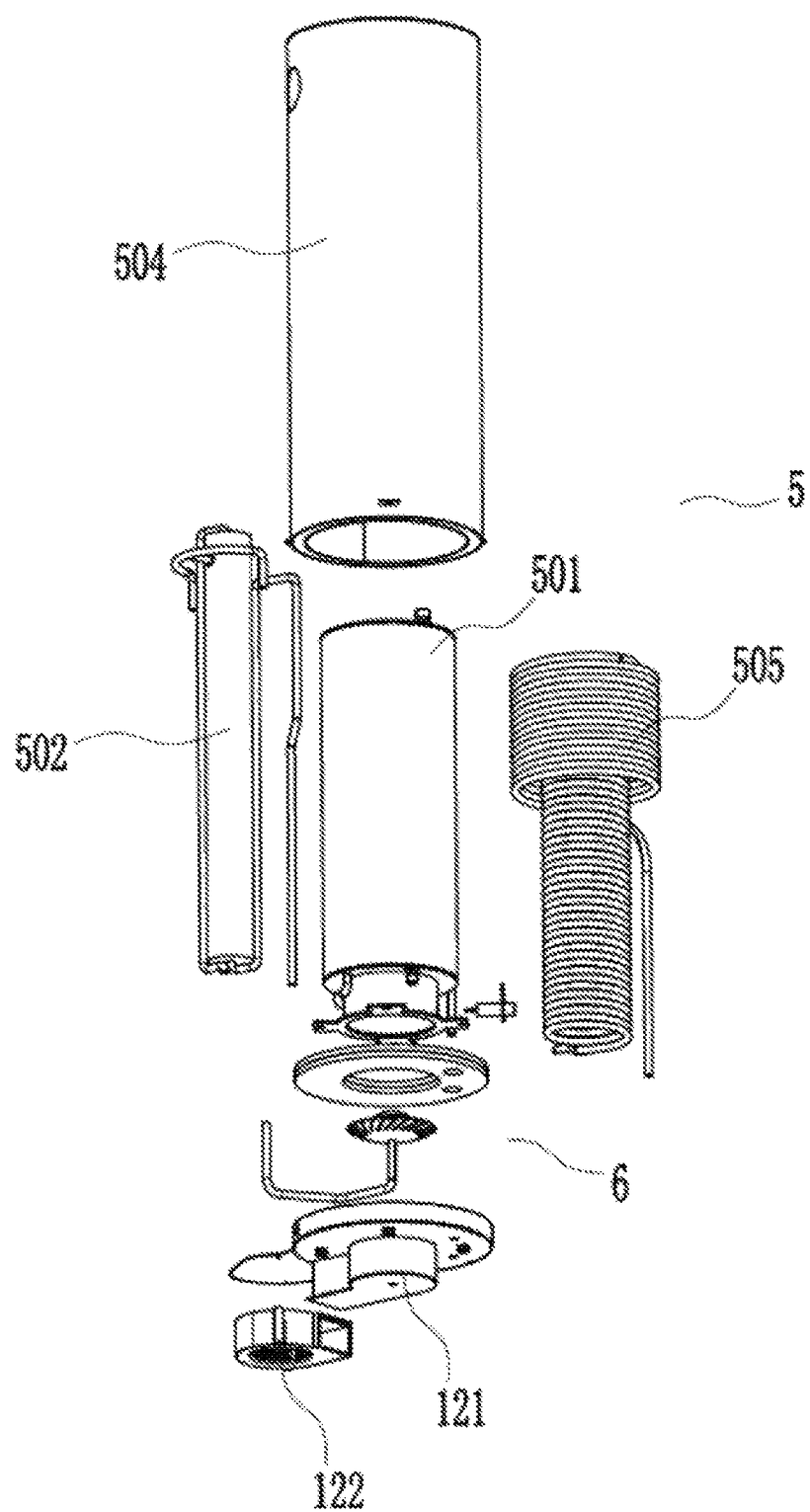
FIG. 12 is a schematic view of a dispersion structure of a hydrogen production system.
Figure 13:
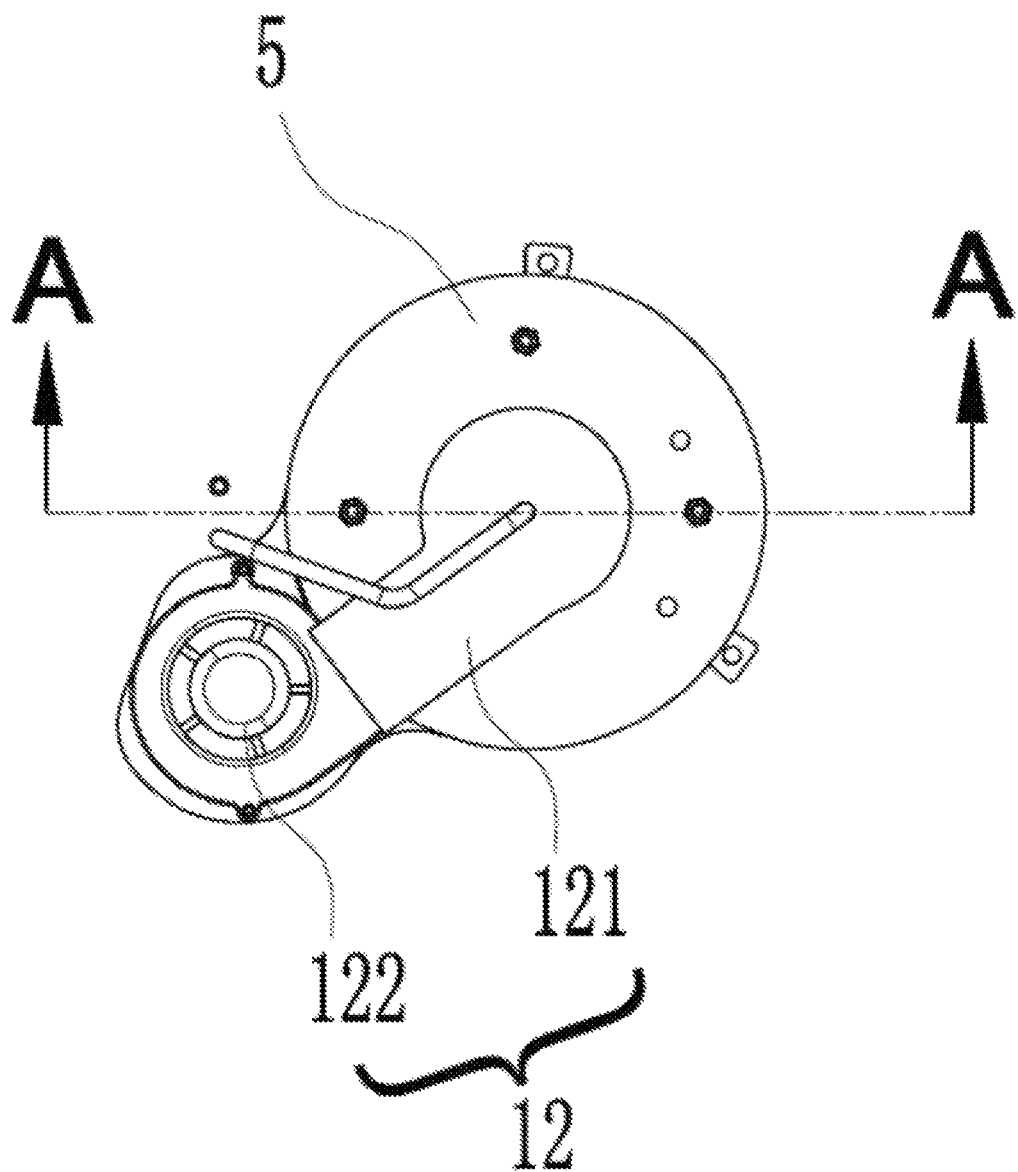
FIG. 13 is a bottom view of a hydrogen production system.
Figure 14:
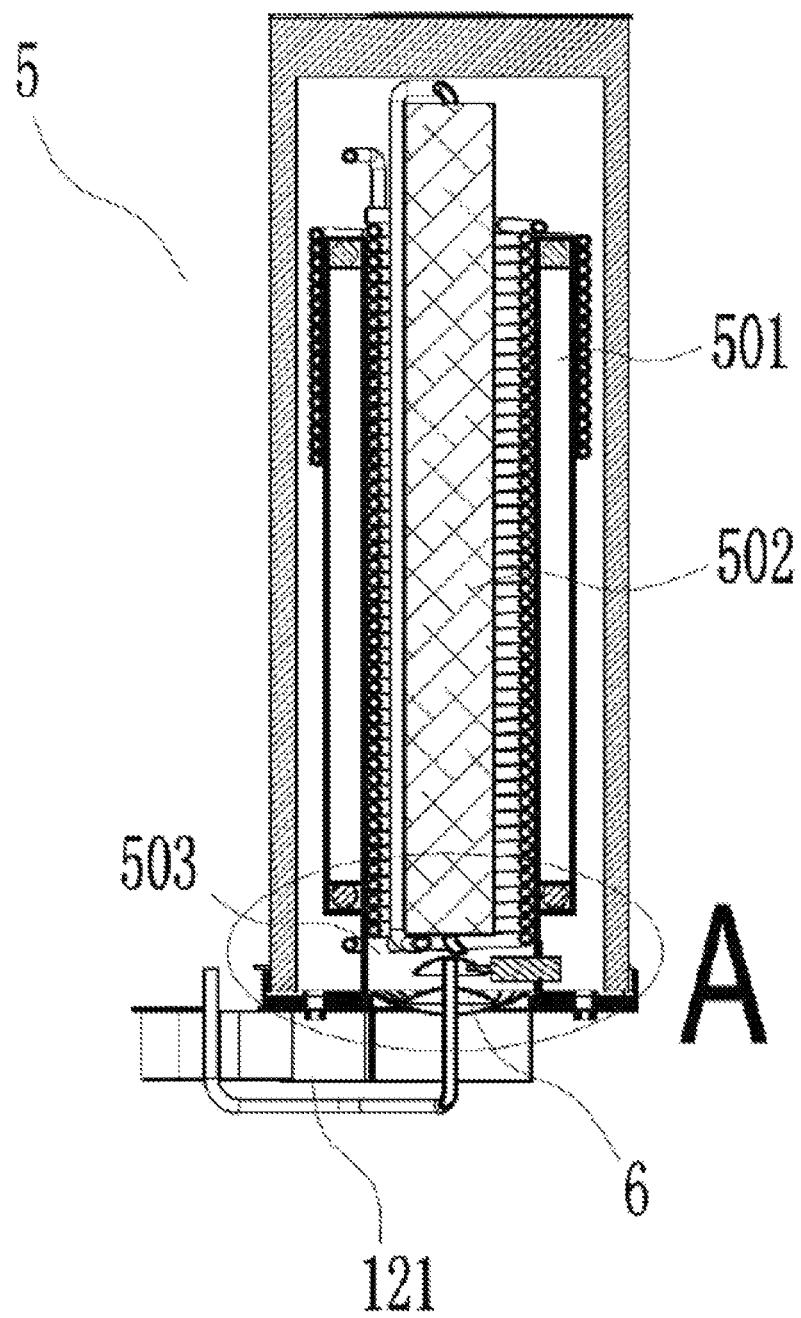
FIG. 14 is a sectional view along a line A-A in FIG. 13.
Figure 15:
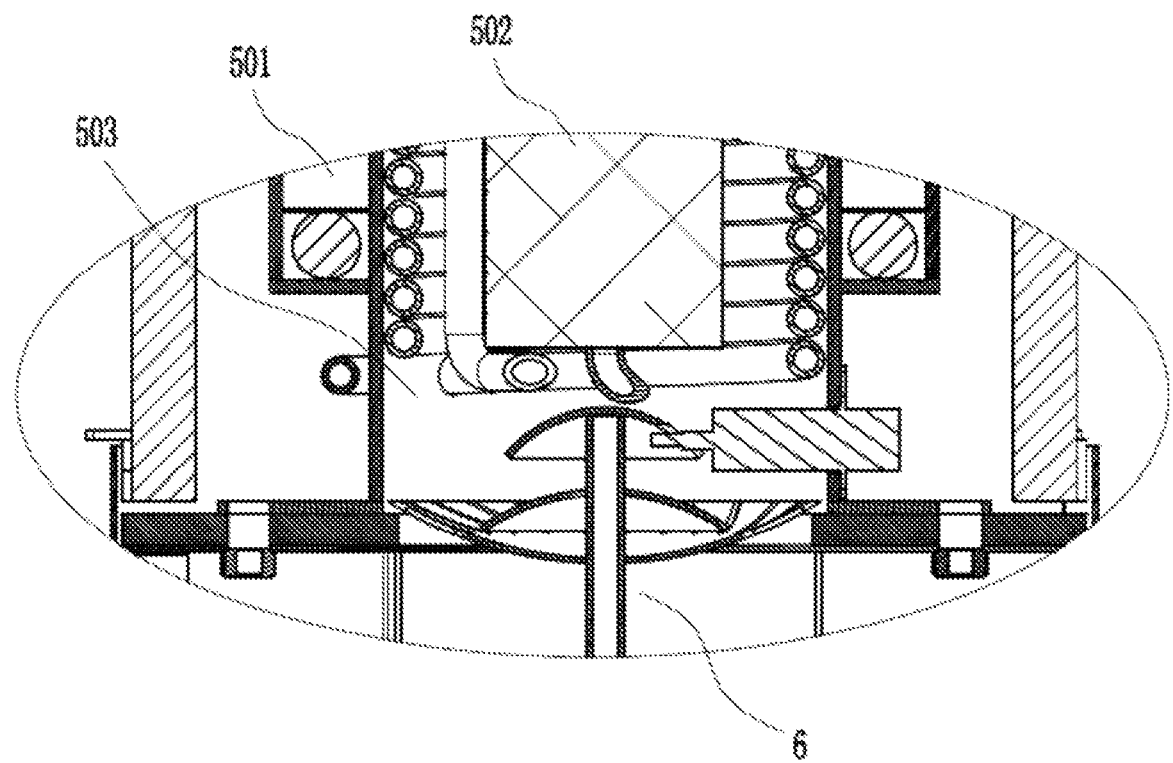
FIG. 15 is an enlarged view of a part A in FIG. 14.

The methanol-water mixture feed system 4, with reference to FIGS. 9-10, includes a main feed pipe 401, the transfer pump 402, the start-up feed solenoid valve 403, a start-up feed branch pipe 404, the hydrogen production feed solenoid valve 405 and a hydrogen production feed branch pipe 406; in the start-up process of the methanol-water mixture reforming hydrogen production generator, the start-up feed solenoid valve 403 is opened and the hydrogen production feed solenoid valve 405 is closed, and methanol-water mixture feedstock is fed through the main feed pipe 401 the transfer pump 402, the start-up feed solenoid valve 403 and the start-up feed branch pipe 404 successively and supplied to the start-up device 6 of the hydrogen production system; in the hydrogen production process of the methanol-water mixture reforming hydrogen production generator, the hydrogen production feed solenoid valve 405 is opened and the start-up feed solenoid valve 404 is closed, and methanol-water mixture feedstock is fed through the main feed pipe 401, the transfer pump 402, the hydrogen production feed solenoid valve 405 and the hydrogen production feed branch pipe 406 successively and supplied to a reforming hydrogen production device 5 of the hydrogen production system;

the hydrogen production system, with reference to FIG. 9 and FIGS. 11-15, includes the reforming hydrogen production device 5 and the start-up device 6, wherein the reforming hydrogen production device 5 includes a heat insulated housing 504, a reforming chamber 501, a separation chamber 502 and a combustion chamber 503 are disposed in the heat insulated housing 504, the reforming chamber 501 is used for producing a gas mixture with carbon dioxide and hydrogen as major components when reforming hydrogen production reaction occurs on methanol and water, the reforming chamber 501 is provided with a catalyst, methanol and water steam in the reforming chamber 501 pass through the catalyst under a pressure of 1-5 MPa, and under the action of the catalyst, methanol cracking reaction and carbon monoxide shift reaction occur, to generate hydrogen and carbon dioxide, and this is a gas-solid catalytic reaction system involving multiple components and multiple reactions, with reaction equations as: (1) $CH_3OH \rightarrow CO+2H_2$, (2) $H_2O+CO \rightarrow CO_2+H_2$ (3) $CH_3OH+H_2O \rightarrow CO_2+3H_2$, a gas mixture with high-temperature containing carbon dioxide and hydrogen as major components is obtained; the separation chamber 502 is used for separating hydrogen from the gas mixture, the hydrogen may be output to the outside or supplied to a fuel cell 7, and the combustion chamber 503 is used for combusting a part of the produced hydrogen in the combustion chamber 503 to provide heat for the operation of the reforming hydrogen production device 5; the start-up device 6 is used in the start-up process of the methanol-water mixture reforming hydrogen production generator, to provide heat for the start-up process of the reforming hydrogen production device 5 through the fuel methanol-water mixture feedstock; and in addition, the reforming hydrogen production device 5 is further provided with heating vaporization coiled tubes 505, methanol and water feedstock are first vaporized via the heating vaporization coiled tubes 505 before entering into the reforming chamber 501;

the power generation system includes the fuel cell 7 used for hydrogen and oxygen in the air to react electrochemically to produce electric energy, at the anode of the fuel cell 7: $2H_2 \rightarrow 4H+ +4e-$, $H_2$ is split into two protons and two electrons, the protons pass through a proton exchange membrane (PEM), the electrons pass through an anode plate and enter into a cathode bipolar plate through an external load, and at the cathode of the fuel cell 7: $O_2+4e- +4H+ \rightarrow 2H_2O$, the protons, the electrons, and $O_2$ are recombined to form $H_2O$; the produced electric energy is output through the power output port 6, and may also be used for charging the rechargeable battery 201. One side of the fuel cell is provided with two draught fans 701, and the other side is provided with an air filtering screen 702, under the driving of the two draught fans 701, external air enters into the fuel cell through the air filtering screen 702, and then is exhausted through the two draught fans 701. On the one hand, the external air cools the fuel cell 7 during the process of entering into the fuel cell 7, on the other hand provides oxygen for electrochemical reactions in the fuel cell 7.

As shown in FIGS. 1-7, the electronic control system is further provided with a wireless signal transmitting and receiving device 8, wherein the wireless signal transmitting and receiving device 8 includes a signal converter 801 and an antenna 802. The antenna 802 is mounted on the signal converter 801, and the signal converter 801 is electrically connected with the control mainboard 1. Further, the methanol-water mixture reforming hydrogen production generator further includes a mobile control device 804 which achieves wireless connection with the wireless signal transmitting and receiving device 8 by way of WIFI. The mobile control device 804 is provided with a display module for displaying data parameters and a control module for setting working procedure of the methanol-water mixture reforming hydrogen production generator. The mobile control device 804 is preferably a smart phone or a tablet computer. By setting the wireless signal transmitting and receiving device 8, the methanol-water mixture reforming hydrogen production generator can be wirelessly set and monitored by the external mobile control device 804.

As shown in FIGS. 1-3 and FIG. 8, the power supply device 2 further includes a first power supply module 202 and a second power supply module 203, in the start-up process of the methanol-water mixture reforming hydrogen production generator, the rechargeable battery 201 supplies power to the methanol-water mixture reforming hydrogen production generator itself by the first power supply module 202; and in the processes of hydrogen production and power generation of the methanol-water mixture reforming hydrogen production generator, the power generation system charges the rechargeable battery 201 by the second power supply module 203 and automatically stops the charging when the rechargeable battery 201 is fully charged. The rechargeable battery 201 is preferably a lithium-ion battery. By setting the power supply device 2, the rechargeable battery can supply power to the methanol-water mixture reforming hydrogen production generator itself without the need of an external power supply during a start-up, and the rechargeable battery can be charged in turn after operation of the fuel cell is finished, so as to be ready for a next start-up.

Figure 16:
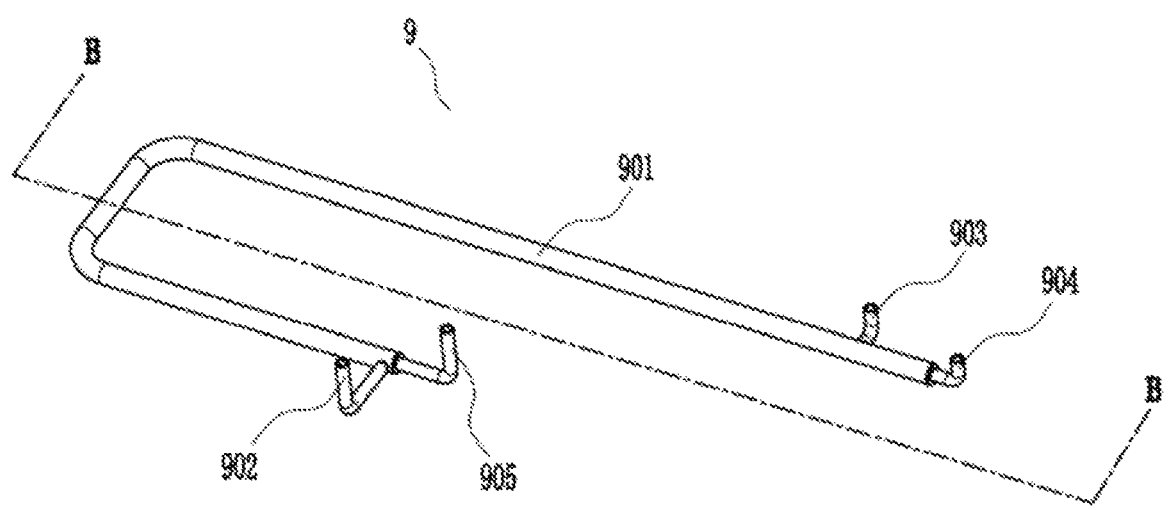
FIG. 16 is a schematic view of a stereostructure of a heat exchange system.
Figure 17:
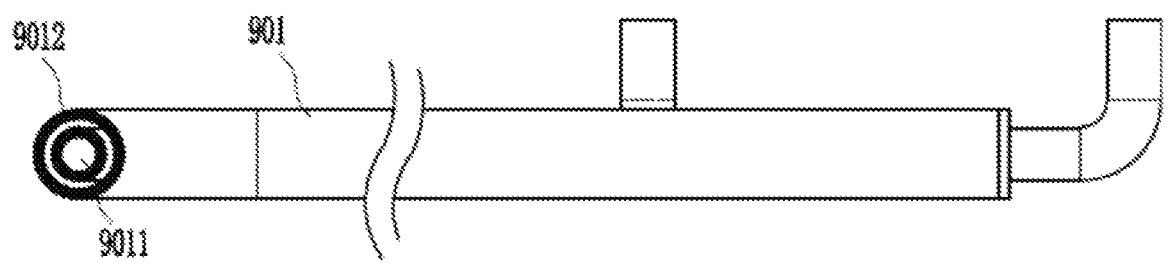
FIG. 17 is a sectional view along a line B-B in FIG. 16.
Figure 18:
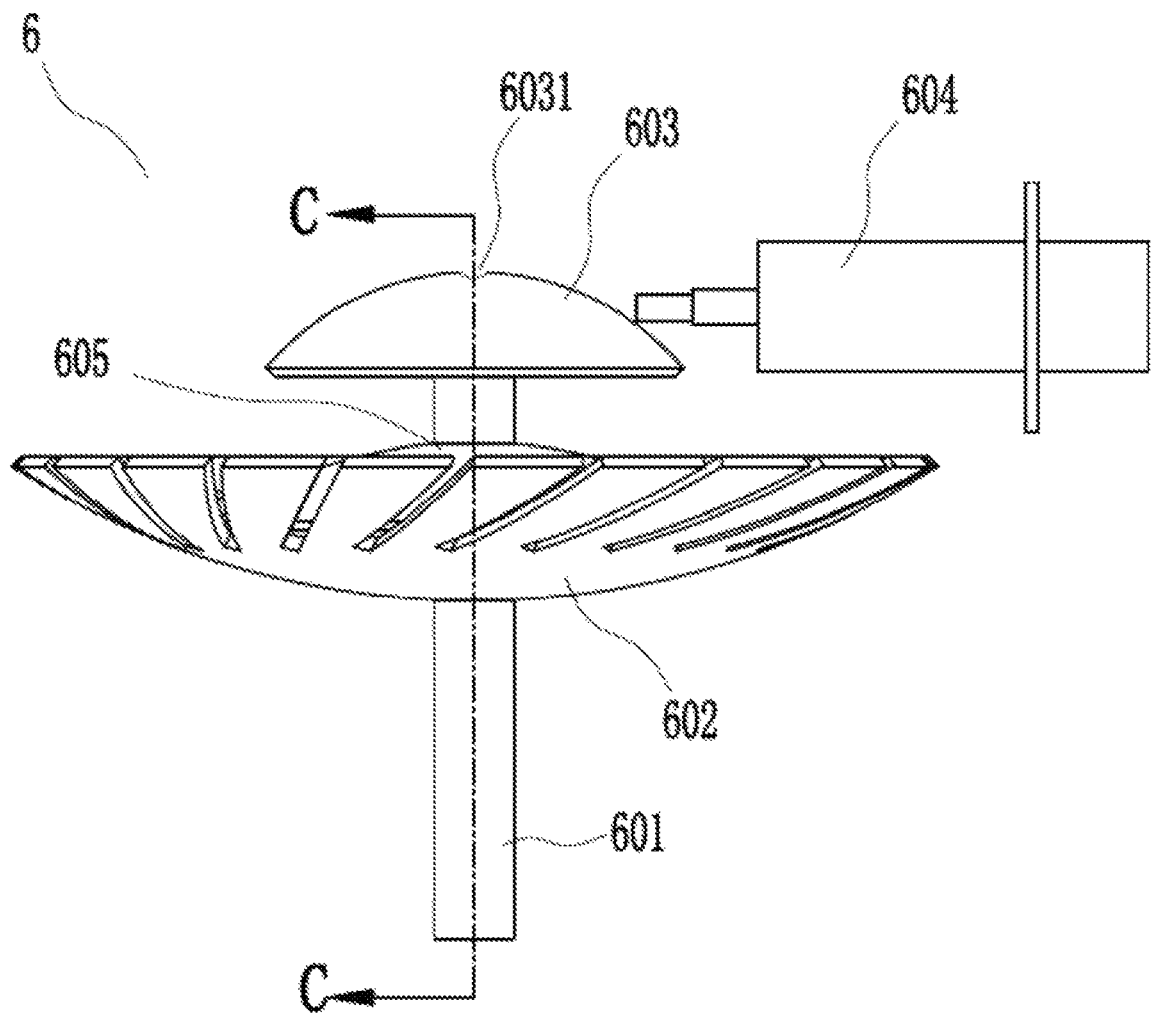
FIG. 18 is a front view of a start-up device.
Figure 19:
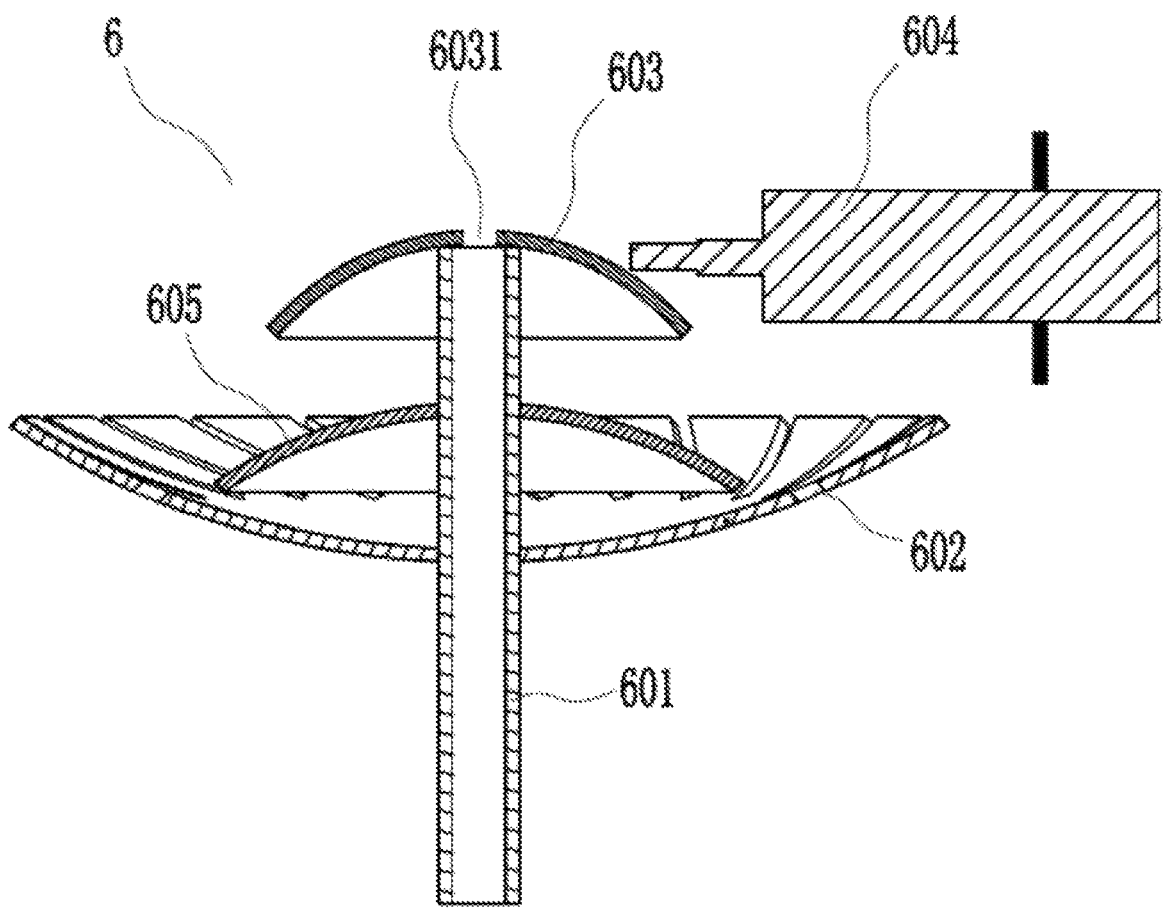
FIG. 19 is a sectional view along a line C-C in FIG. 18.
Figure 20:
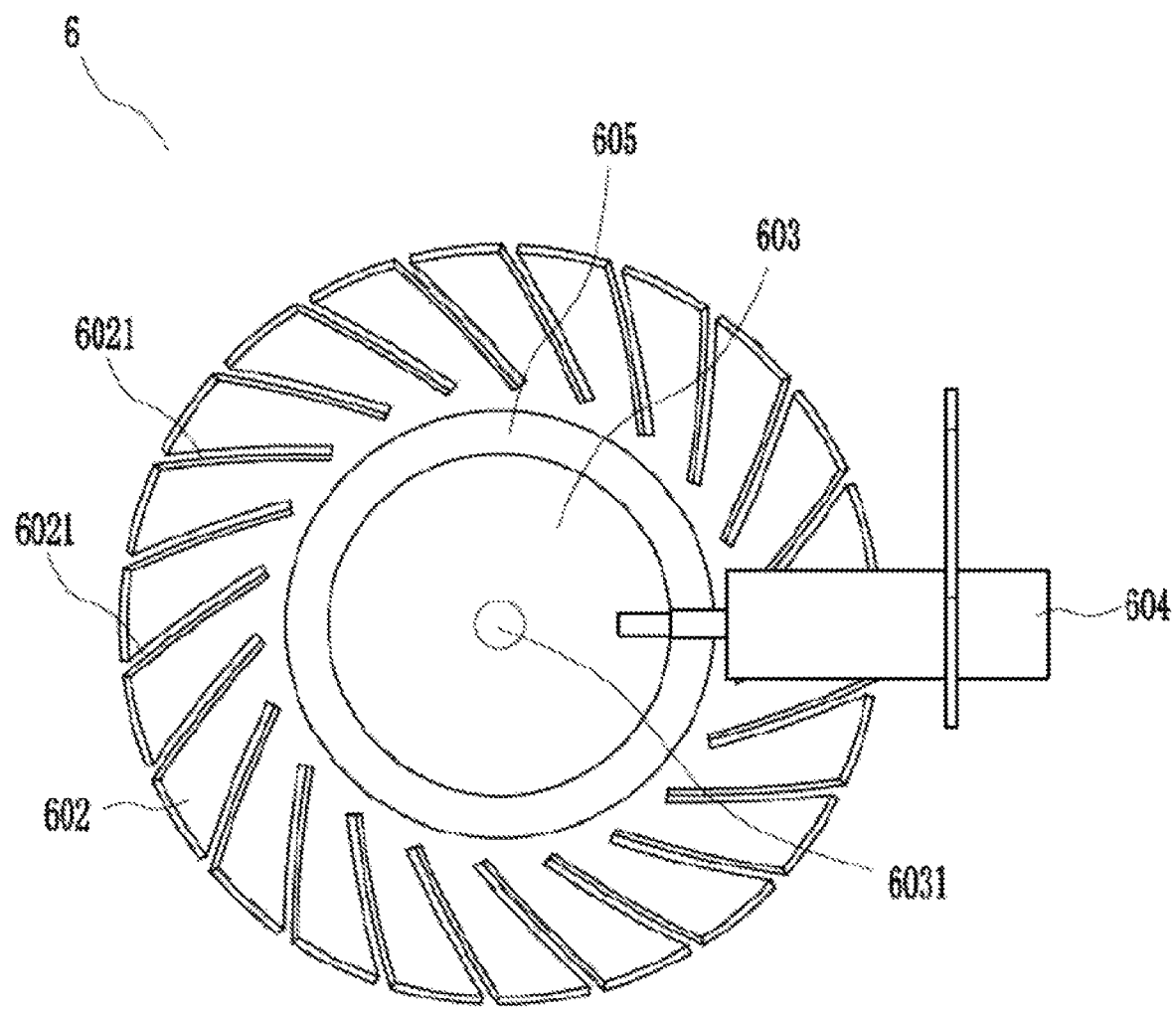
FIG. 20 is a top view of a start-up device.

As shown in FIGS. 16-17, the methanol-water mixture reforming hydrogen production generator further includes a heat exchange system 9, wherein the heat exchange system includes a co-axial double-layer heat exchange pipe 901, a normal temperature liquid inlet 902, a high temperature liquid outlet 903, a high temperature gas inlet 904 and a low temperature gas outlet 905. The inner-layer pipeline of the double-layer heat exchange pipe 901 is a gas pipeline 9011, and the outer-layer pipeline is a liquid pipeline 9012; at one end of the double-layer heat exchange pipe 901, the gas pipeline 9011 is in communication with the high temperature gas inlet 904, and the liquid pipeline 9012 is in communication with the high temperature liquid outlet 904; at the other end of the double-layer heat exchange pipe 901, the gas pipeline 9011 is in communication with the low temperature gas outlet 905, and the liquid pipeline 9012 is in communication with the normal temperature liquid inlet 902; in the hydrogen production process of the methanol-water mixture reforming hydrogen production generator, the methanol-water mixture feedstock in the hydrogen production feed branch pipe 406 enters the liquid pipeline 9012 by the normal temperature liquid inlet 902, the hydrogen produced by the hydrogen production system enters the gas pipeline 9011 by the high temperature gas inlet 904, the methanol-water mixture feedstock in the liquid pipeline 9012 and the hydrogen in the gas pipeline 9011 exchange heat thereof, the methanol-water mixture feedstock increases in temperature and is output to the reforming hydrogen production device 5 by the high temperature liquid outlet 903, and the hydrogen decreases in temperature and is output to the outside or to the fuel cell 7 by the low temperature gas outlet 905. By setting the heat exchange system, hydrogen can be cooled to a relative low temperature before entering into the fuel cell 7 and therefore does not cause damage to the fuel cell 7, and meanwhile methanol-water mixture feedstock entered into the reforming hydrogen production device 5 is heated in the heat exchanger, so as to reduce combustion heating intensity within the reforming hydrogen production device 5 and drastically improve utilization efficiency of the methanol-water mixture feedstock.

As shown in FIGS. 12, 14, 15 and 18-20, the start-up device 6 of the hydrogen production system includes a feed riser pipe 601, a flame tray 602, an upper cover body 603 and an igniter 604, the flame tray 602 and the upper cover body 603 are disposed on the riser pipe 601 from the bottom up; the middle part of the upper cover body 603 is provided with an aperture 6031 in communication with the riser pipe 601, the methanol-water mixture feedstock may flow from the feed riser pipe 601 up to the aperture 6031 and be exuded from the aperture and spread around along the upper side surface of the upper cover body 603 until flowing into the flame tray 602; an ignition position of the igniter 604 corresponds to the upper side surface of the upper cover body 603. Further, a lower cover body 605 is further provided between the flame tray 602 and the upper cover body 603, the lower cover body 605 can prevent methanol-water mixture feedstock in the flame tray 602 from sputtering outwardly. A plurality of vent holes 6021 are disposed on the periphery of the flame tray 602, so that external air enters though the vent holes 6021 into the flame tray 602 and the combustion chamber 503 in the reforming hydrogen production device 5. Preferably, the vent holes 6021 of the flame tray 602 are spiral vent hole grooves 6021, so that the flame combustion intensity can be increased, and the flame rises in a spiral-like shape, and spiral flame is more uniform and noise-free. Since the start-up device 6 employs a combination of the flame tray 602 and the upper cover body 603, methanol-water mixture feedstock can spread around on the upper side of the upper cover body 603, and can burn rapidly with large scale on the upper side of the upper cover body 603 after ignition, while unburned methanol-water mixture feedstock drops into the flame tray 602 for further burning with large scale. Thus, the start-up heat required by the reforming hydrogen production device is rapidly provided by the cooperation of the flame tray 602 and the upper cover body 603, so that the start-up speed of the hydrogen production system is very fast, and the system can normally start within 3 minutes.

As shown in FIGS. 1, 9 and 11-14, an air inlet device 12 is provided below the flame tray 602. The air inlet device 12 includes an air inlet channel 121 and a blower 122. The blower 122 blows the external air first into the air inlet channel 121 and then into the flame tray 602 and the combustion chamber 503 of the reforming hydrogen production device 5.

Figure 1:
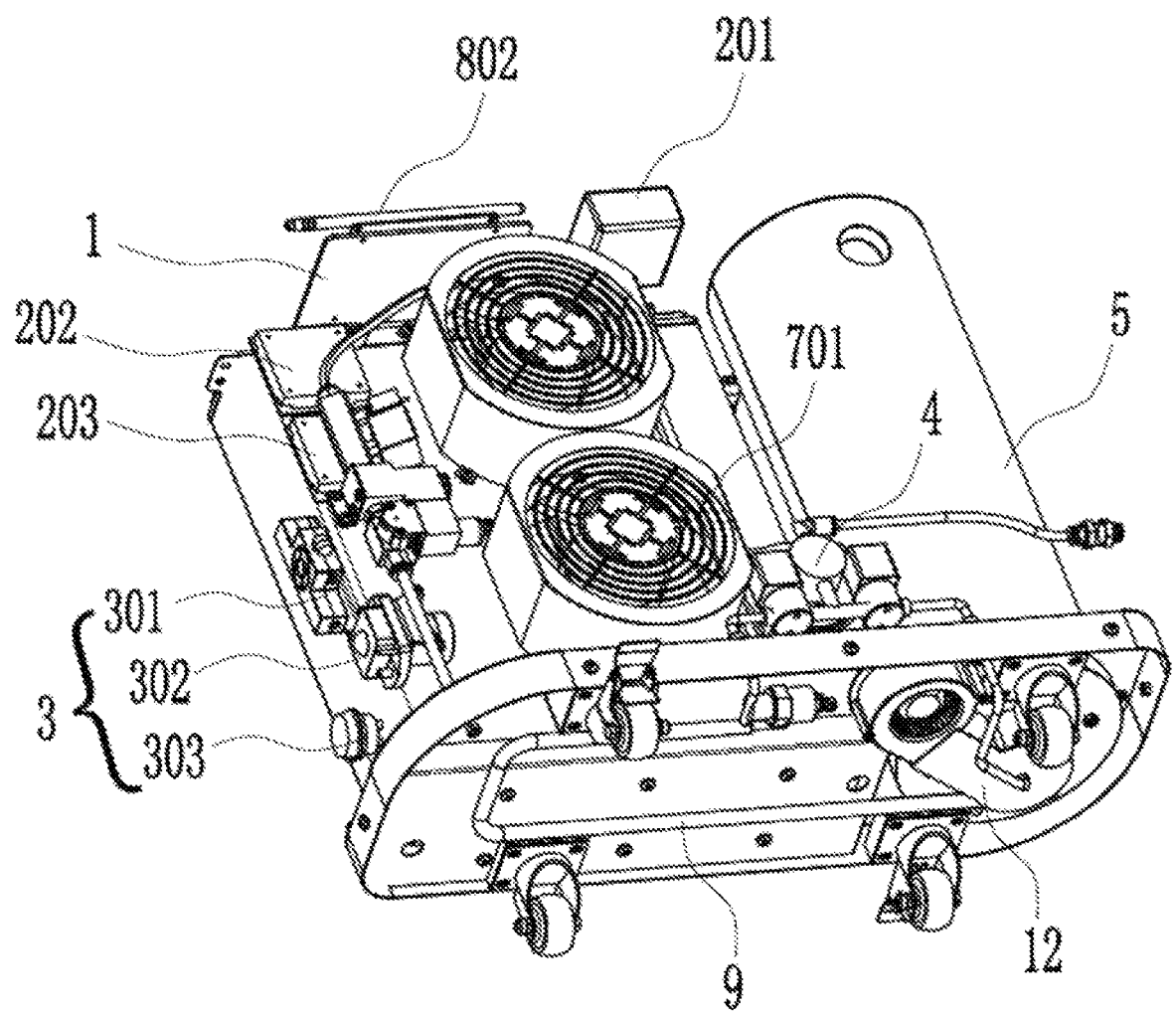
FIG. 1 I is a schematic view of a stereostructure of a methanol-water mixture reforming hydrogen production generator (with a housing removed).
Figure 2:
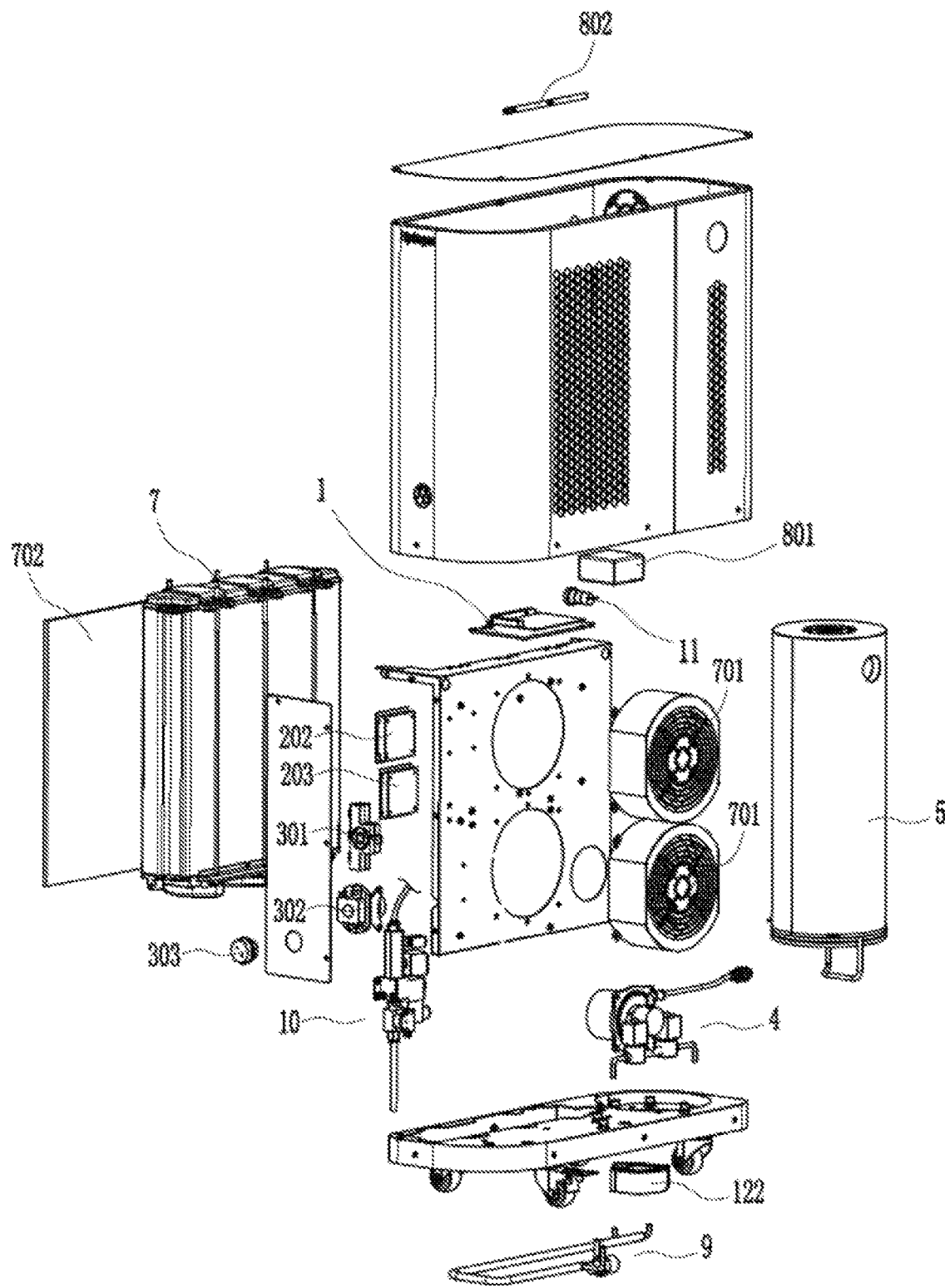
FIG. 2 is a schematic view of a dispersion structure of a methanol-water mixture reforming hydrogen production generator (with the housing removed).
Figure 3:
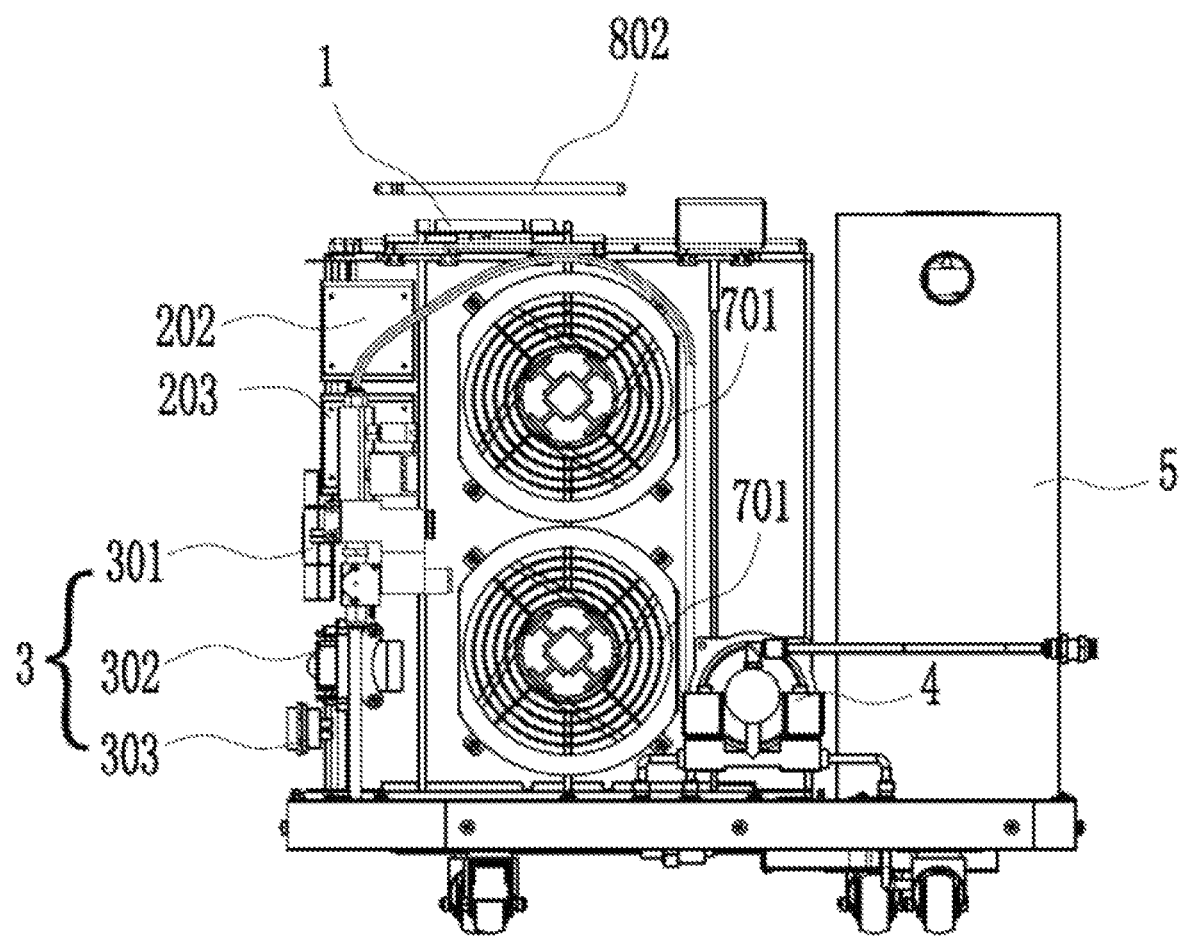
FIG. 3 is a front view of a methanol-water mixture reforming hydrogen production generator (with the housing removed).DESCRIPTION
Figure 4:
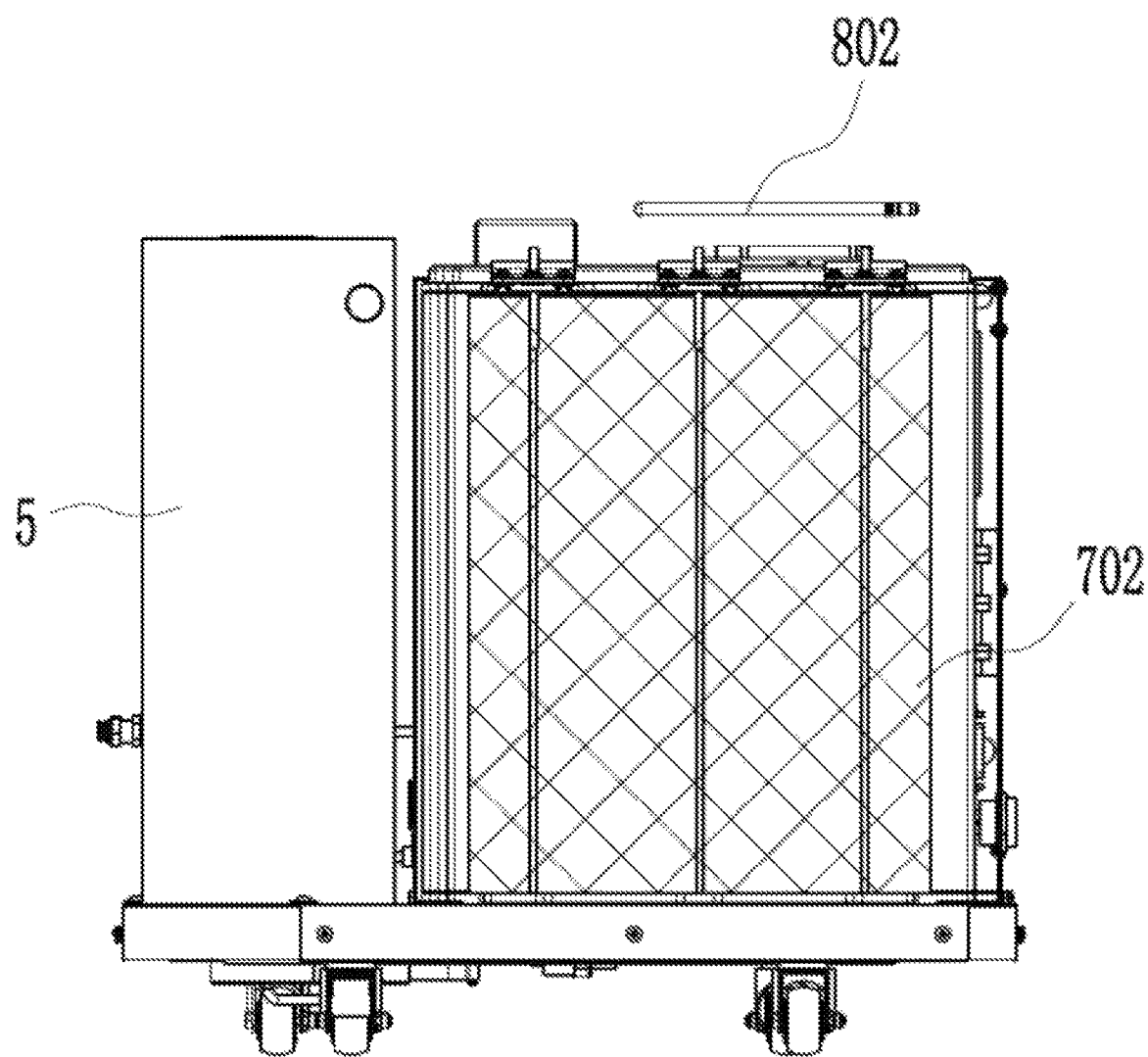
FIG. 4 is a rear view of a methanol-water mixture reforming hydrogen production generator (with the housing removed).
Figure 5:
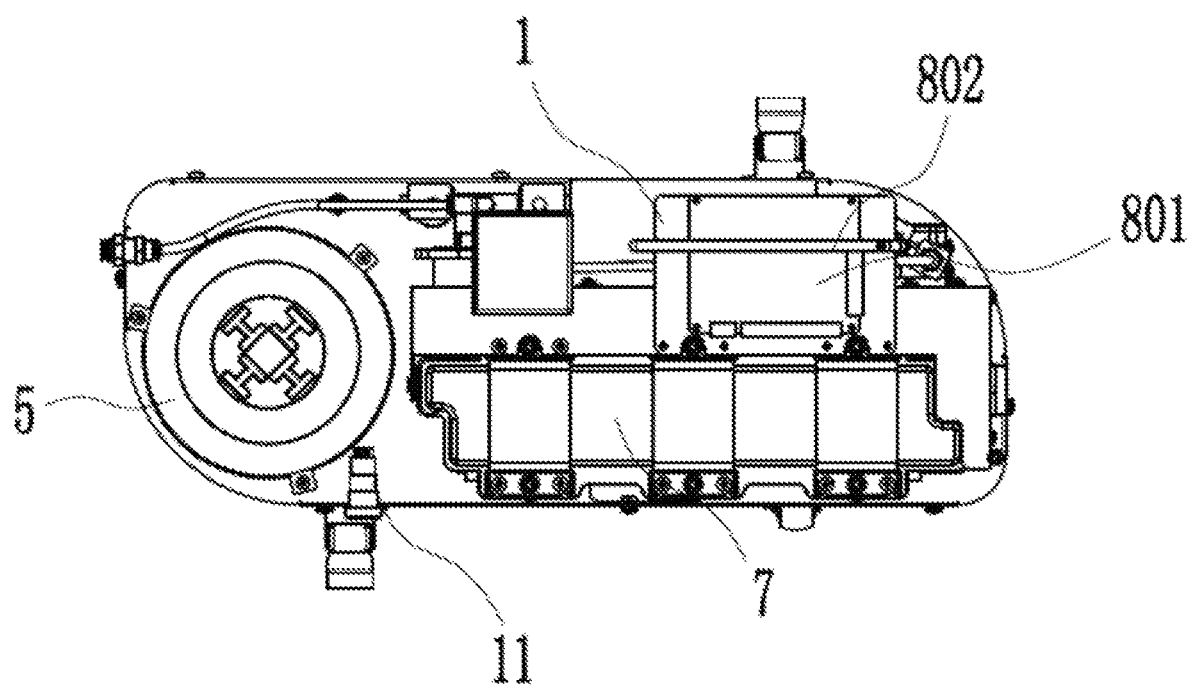
FIG. 5 is a top view of a methanol-water mixture reforming hydrogen production generator (with the housing removed).
Figure 7:
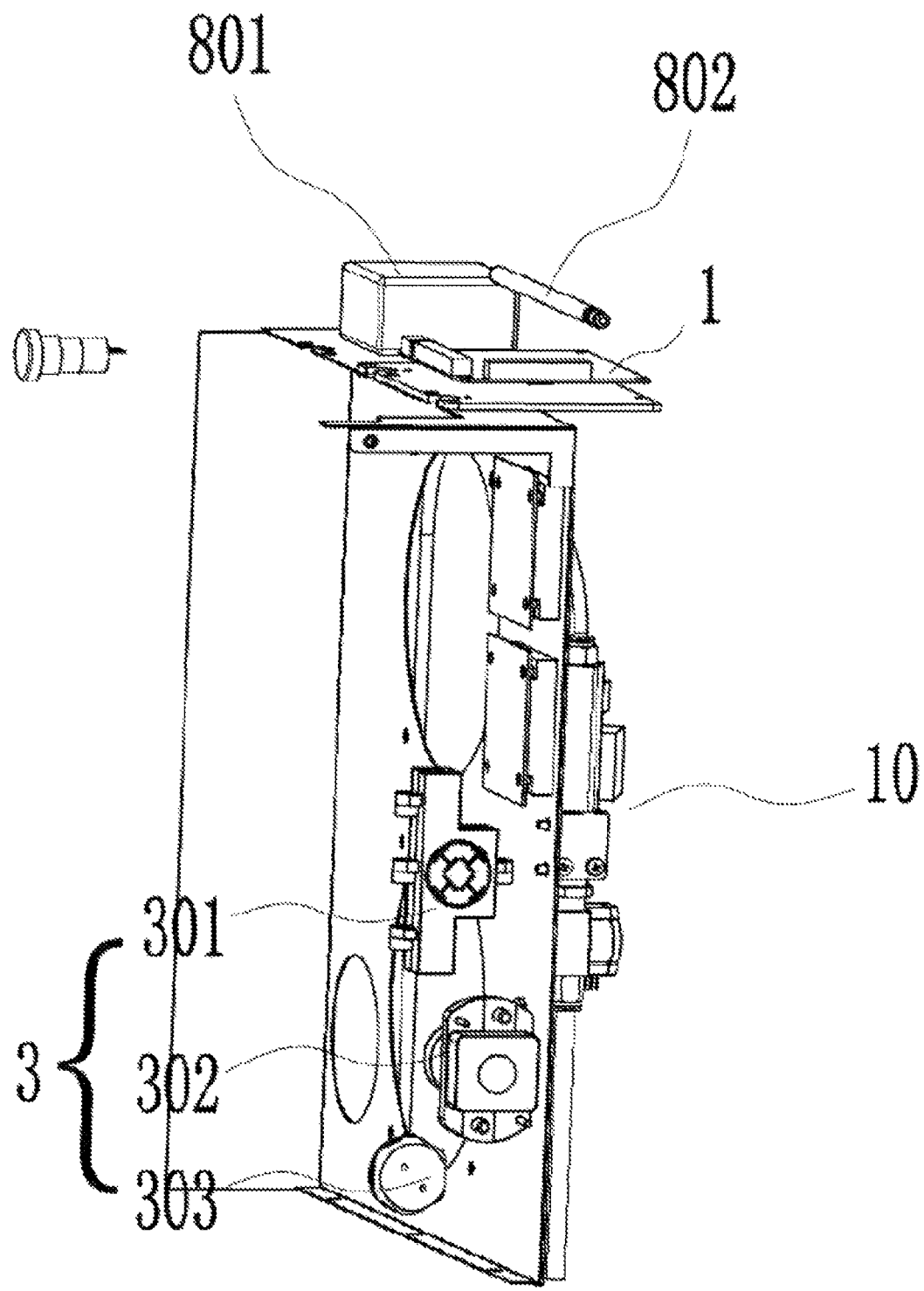
FIG. 7 is a schematic view of a mounting structure of an electronic control system and a gas control system.
Figure 8:
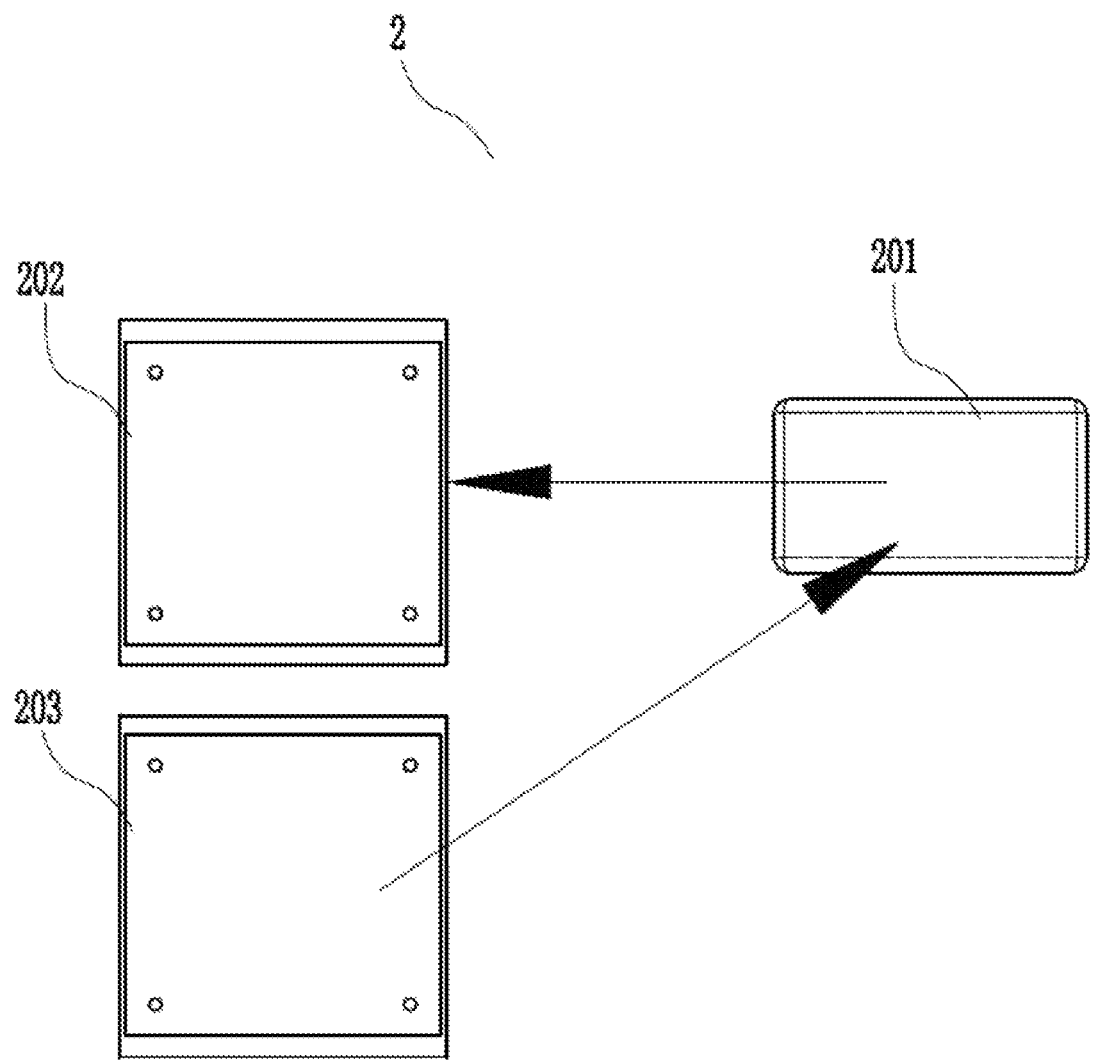
FIG. 8 is a schematic view of charging and discharging between a rechargeable battery and a first power supply module and a second power supply module.
Figure 21:
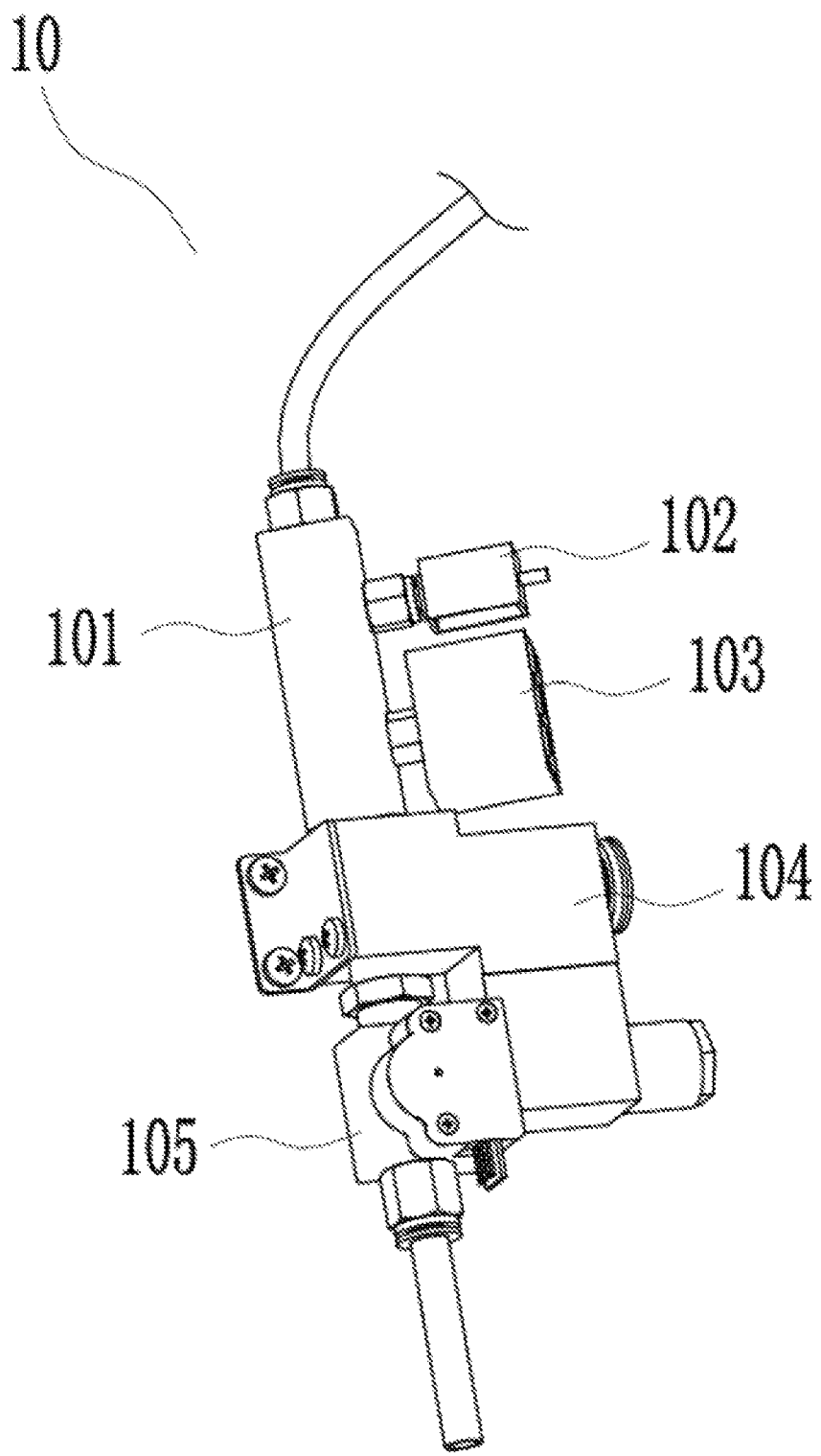
FIG. 21 is a schematic view of a stereostructure of a gas control system.

As shown in FIGS. 2, 7 and 21, the methanol-water mixture reforming hydrogen production generator further includes a gas control system 10 provided on a transfer pipeline used for transferring hydrogen to the fuel cell 7. The gas control system 10 includes a safety gas control pipe 101, a safety solenoid valve 1032 and a safety air pressure sensor 103, and the safety solenoid valve 1032 and the safety air pressure sensor 103 are mounted on the safety gas control pipe 101. The safety gas control pipe 101 has a gas release hole matched with the safety solenoid valve 102, and in a process that hydrogen passes through the safety gas control pipe 101, if the safety air pressure sensor 103 senses that a hydrogen pressure is higher than an alert pressure, the safety solenoid valve 102 is controlled to open the gas release hole, to discharge hydrogen to the outside. At this time, the control mainboard 1 controls an alarm (not shown) to generate an alarm. The safety solenoid valve 102 can be powered by the rechargeable battery 201, so as to ensure that the safe solenoid valve 102 is powered at any time. When the system has a problem in exhausting, the gas release hole of the safety gas control pipe 101 can be closed again by the safety solenoid valve 102. Because of the setting of the gas control system 10, problems of damage to devices such as the fuel cell 7 and the like by high hydrogen pressure caused by abnormality in the system are thereby avoided. Further, the gas control system 10 also includes a basic solenoid valve 104 and a basic air pressure sensor 105. The basic solenoid valve 104 is used to open and close hydrogen delivery channel under normal conditions. The basic air pressure sensor 105 is used to sense hydrogen pressure under normal conditions.

The contents stated above are only preferred embodiments of the present invention, and all the subtle modification, equivalent changes and embellishment of the above embodiments according to the technical schemes of the invention shall fall within the protection scope of the invention.

We claim:

1. A methanol-water mixture reforming hydrogen production generator, characterized by comprising an electronic control system, a methanol-water mixture feed system, a hydrogen production system and a power generation system, wherein: the electronic control system comprises a control mainboard, a power supply device and a power output port, and the control mainboard controls operations of the methanol-water mixture feed system, the hydrogen production system and the power generation system; the power supply device comprises a rechargeable battery supplying power to the methanol-water mixture reforming hydrogen production generator in a start-up process of the methanol-water mixture reforming hydrogen production generator; the power output port is used for outputting power to the outside by the power generation system; the methanol-water mixture feed system comprises a main feed pipe, a transfer pump, a start-up feed solenoid valve, a start-up feed branch pipe, a hydrogen production feed solenoid valve and a hydrogen production feed branch pipe; in the start-up process of the methanol-water mixture reforming hydrogen production generator, the start-up feed solenoid valve is opened and the hydrogen production feed solenoid valve is closed, and methanol-water mixture feedstock is fed through the main feed pipe, the transfer pump, the start-up feed solenoid valve and the start-up feed branch pipe successively and supplied to a start-up device of the hydrogen production system; in the hydrogen production process of the methanol-water mixture reforming hydrogen production generator, the hydrogen production feed solenoid valve is opened and the start-up feed solenoid valve is closed, and methanol-water mixture feedstock is fed through the main feed pipe, the transfer pump, the hydrogen production feed solenoid valve and the hydrogen production feed branch pipe successively and supplied to a reforming hydrogen production device of the hydrogen production system; the hydrogen production system comprises the reforming hydrogen production device and the start-up device, wherein the reforming hydrogen production device comprises a reforming chamber, a separation chamber and a combustion chamber, the reforming chamber is used for producing a gas mixture with carbon dioxide and hydrogen as major components when reforming hydrogen production reaction occurs on methanol and water, the separation chamber is used for separating hydrogen from the gas mixture, the hydrogen may be output to the outside or supplied to a fuel cell, and the combustion chamber is used for combusting a portion of the produced hydrogen in the combustion chamber to provide heat for the operation of the reforming hydrogen production device; the start-up device is used in the startup process of the methanol-water mixture reforming hydrogen production generator, to provide heat for the start-up process of the reforming hydrogen production device through the fuel methanol-water mixture feedstock; wherein the start-up device of the hydrogen production system comprises a feed riser pipe, a flame tray, an upper cover body and an igniter, wherein the flame tray and the upper cover body are disposed on the feed riser pipe from the bottom up; the middle part of the upper cover body is provided with an aperture in communication with the feed riser pipe, the methanol-water mixture feedstock flows from the feed riser pipe up to the aperture and be exuded from the aperture and spread around along the upper side surface of the upper cover body until flowing into the flame tray; and an ignition position of the igniter corresponds to the upper side surface of the upper cover body; and the power generation system comprises a fuel cell, wherein the fuel cell is used for producing electric energy when electrochemical reaction occurs on hydrogen and oxygen in the air, the produced electric energy is output through the power output port, and the produced electric energy may also be used to charge the rechargeable battery.

2. The methanol-water mixture reforming hydrogen production generator of claim 1, characterized in that the electronic control system is further provided with a wireless signal transmitting and receiving device, wherein the wireless signal transmitting and receiving device comprises a signal converter electrically connected with the control mainboard and an antenna mounted on the signal converter.

3. The methanol-water mixture reforming hydrogen production generator of claim 2, characterized by further comprising a mobile control device, wherein the mobile control device achieves wireless connection with the wireless signal transmitting and receiving device by way of WIFI, and the mobile control device is provided with a display module for displaying data parameters and a control module for setting working procedure of the methanol-water mixture reforming hydrogen production generator.

4. The methanol-water mixture reforming hydrogen production generator of claim 1, characterized in that the power supply device further comprises a first power supply module and a second power supply module, and in the start-up process of the methanol-water mixture reforming hydrogen production generator, the rechargeable battery supplies power to the methanol-water mixture reforming hydrogen production generator itself through the first power supply module; and in the hydrogen production and power generation process of the methanol-water mixture reforming hydrogen production generator, the power generation system charges the rechargeable battery through the second power supply module and automatically stops the charging when the rechargeable battery is fully charged.

5. The methanol-water mixture reforming hydrogen production generator of claim 1, characterized by further comprising a heat exchange system, wherein the heat exchange system comprises a co-axial double-layer heat exchange pipe, a normal temperature liquid inlet, a high temperature liquid outlet, a high temperature gas inlet and a low temperature gas outlet; the inner-layer pipeline of the double-layer heat exchange pipe is a gas pipeline, and the outer-layer pipeline is a liquid pipeline; at one end of the double-layer heat exchange pipe, the gas pipeline is in communication with the high temperature gas inlet and the liquid pipeline is in communication with the high temperature liquid outlet; at the other end of the double-layer heat exchange pipe, the gas pipeline is in communication with the low temperature gas outlet and the liquid pipeline is in communication with the normal temperature liquid inlet; and in the hydrogen production process of the methanol-water mixture reforming hydrogen production generator, the methanol-water mixture feedstock in the hydrogen production feed branch pipe enters the liquid pipeline by the normal temperature liquid inlet, the hydrogen produced by the hydrogen production system enters the gas pipeline by the high temperature gas inlet, methanol-water mixture feedstock in the liquid pipeline and hydrogen in the gas pipeline exchange heat thereof, the methanol-water mixture feedstock increases in temperature and is output to the reforming hydrogen production device by the high temperature liquid outlet, and the hydrogen decreases in temperature and is output to the outside or to the fuel cell by the low temperature gas outlet.

6. The methanol-water mixture reforming hydrogen production generator of claim 1, characterized in that a lower cover body is further provided between the flame tray and the upper cover body, wherein the lower cover body is mounted on the feed riser pipe, and may prevent the methanol-water mixture feedstock in the flame tray from sputtering outwardly.

7. The methanol-water mixture reforming hydrogen production generator of claim 6, characterized in that the vent holes of the flame tray are spiral vent hole grooves.

8. The methanol-water mixture reforming hydrogen production generator of claim 1, characterized in that a plurality of vent holes are disposed on the periphery of the flame tray, so that external air enters though the vent holes into the flame tray and the combustion chamber in the reforming hydrogen production device.

9. The methanol-water mixture reforming hydrogen production generator of claim 1, characterized by comprising a gas control system, wherein the gas control system is disposed on a transfer pipeline used for transferring hydrogen to the fuel cell; the gas control system comprises a safety gas control pipe, a safety solenoid valve and a safety air pressure sensor, wherein the safety solenoid valve and the safety air pressure sensor are mounted on the safety gas control pipe; the safety gas control pipe has a gas release hole matched with the safety solenoid valve, and in a process that hydrogen passes through the safety gas control pipe, if the safety air pressure sensor senses that a hydrogen pressure is higher than an alert pressure, the safety solenoid valve is controlled to open the gas release hole, to discharge hydrogen to the outside; and the safety solenoid valve may be powered by the rechargeable battery.

* * * * *